(12) United States Patent
Middlebrook

(10) Patent No.: US 6,293,264 B1
(45) Date of Patent: *Sep. 25, 2001

(54) SUPERCHARGER AFTERCOOLER FOR INTERNAL COMBUSTION ENGINES

(76) Inventor: James K. Middlebrook, 5351 Bonsai Ave., Moorpark, CT (US) 93021

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,721

(22) Filed: Oct. 28, 1998

Related U.S. Application Data

(63) Continuation of application No. 09/181,721, filed on Oct. 28, 1998.
(60) Provisional application No. 60/064,275, filed on Oct. 30, 1997.

(51) Int. Cl.$^7$ ...................................... F02B 29/04
(52) U.S. Cl. ........................ 123/563; 123/184.21
(58) Field of Search ............... 123/563, 184.21; 165/174

(56) References Cited

U.S. PATENT DOCUMENTS 4,236,492 * 12/1980 Tholen .................... 123/563

* cited by examiner

*Primary Examiner*—Noah P. Kamen
(74) *Attorney, Agent, or Firm*—Kelly Bauersfeld Lowry & Kelley, LLP

(57) ABSTRACT

An aftercooler for a supercharged internal combustion engine for cooling supercharged air delivered to the internal combustion engine from the supercharger. The aftercooler has an air intake plenum with an air inlet for receiving supercharged air from the supercharger and an air outlet, a liquid-to-air heat exchanger unit, and a lower plenum for connection to the engine. The heat exchanger unit has an air intake side and an air outlet side, cooling liquid passageways and air passageways passing adjacent to the cooling liquid passageways to cool the supercharged air passing. The lower air inlet plenum has an air inlet for receiving cooled air from the liquid-to-air heat exchanger unit and directs the supercharged cooled air to an air outlet for connection to a cylinder head of an internal combustion engine.

15 Claims, 8 Drawing Sheets

SUPERCHARGER AFTERCOOLER FOR INTERNAL COMBUSTION ENGINES

CROSS REFERENCE TO RELATED APPLICATIONS

This application is a continuation application of U.S. patent application Ser. No. 09/181,721, filed Oct. 28, 1998, pending, which is based upon provisional patent application No. 60/064,275, filed Oct. 30, 1997.

BACKGROUND OF THE INVENTION

In the field of performance vehicles, the advantages of supercharging are well recognized. The addition of several pounds of intake air pressure or boost improves the horsepower and torque output of most internal combustion engines and particularly those used in racing.

An example of a representative supercharger is the system disclosed in the instant inventor's U.S. Pat. No. 5,224,459. Superchargers of this type are belt-driven centrifugal blowers that may be attached to stock engines and are able to boost performance without engine modification.

Under extreme conditions, the limiting factor in the power output is not the volume and pressure of the air which is introduced into the intake manifold on command but the temperature of the intake air. Increase in temperature affects the volumetric efficiency and acts to reduce the number of molecules per liter of intake air, affects the actual mixture, and consequently limits the horsepower output. In addition, higher temperatures of the air/fuel charge during the compression stroke increase the danger of destructive detonation.

In turbocharged internal combustion engines, intercooling and aftercooling are well known. A turbocharger, which is powered by heated exhaust gases, adds heat by conduction through the metal parts to the intake or induction air, in addition to the heat added by compression. Consequently, a variety of different types of intercoolers and aftercoolers have been developed for turbochargers and particularly for compression ignition (diesel) engines. Such cooling arrangements typically are not adaptable to belt-driven centrifugal superchargers.

Attempts have been made in the past to cool the intake air after discharge from non-turbo superchargers before it reaches the intake manifold of the engine. This has been accomplished by employing air-to-air cooling by placing ducting (such as made from heat conducting material) from the supercharger to the intake manifold in an area where the outside passage of air tends to cool the exterior of the duct. Placing cooling fins on metal parts of the supercharger or its ducting is another approach. One further approach has been to add a radiator in the path between outside air flow and the engine compartment, similar to existing engine cooling radiators, and connecting an air to water heat exchanger within the duct from the supercharger to the engine, and providing water-to-air cooling. However, these prior art attempts have not totally fulfilled the need for effective intake air cooling.

Another problem in internal combustion engines is the distribution of intake air to each of the cylinders. This must be as even as possible despite the difference in distance between each cylinder and the air intake source. In the past, addition of most types of superchargers would interrupt or destroy any existing tuning of the intake runners. Addition of an aftercooler in most supercharger installations has not allowed tuning of the intake runners. Intake manifold pressure, flow differences and turbulent airflow tend to adversely affect the power limits achievable within existing engines.

There accordingly remains a need for an effective aftercooler for supercharged internal combustion engines.

BRIEF SUMMARY OF THE INVENTION

I have considered the foregoing problems and limitations in existing supercharger systems and have concluded that it is possible to provide significant cooling and to retain the tuned runners of supercharged air before the air reaches the engine intake manifold with a minimal reduction in boost due to lengthy ducting and exchanger sizing and types. I have also determined that it is possible within the cooling operation to enhance the intake air distribution in order to minimize or eliminate volumetric or pressure differences between cylinders and to minimize unintended and unwanted turbulence at the intake manifold runners.

The invention provides an easily bolted-on aftercooler that does not require significant modifications to the engine other than the removal of the engine manifold and its replacement with the aftercooler and its accessories. A source of cooling water and piping and cooling liquid pump that may be external to the engine compartment completes the cooling system. The source of cooling water is ideally a closed circuit cooling system with its own pump, reservoir and return line. In certain cases, the reservoir made be filled at the beginning of a race sequence with ice water for rapid cooling of intake air. The aftercooler of this invention matches engine manifolds of any number of shapes, including manifolds with rectangular and round ports, or other desired shapes.

Each of these objectives described above is accomplished with an aftercooler system which includes a cover defining an intake chamber or intake plenum, an air-to-liquid heat exchanger and includes a generally internally finned but straight-through air passages extending from the intake plenum into the outlet plenum. The cover communicates between the supercharger output duct and the upper plenum. The heat exchanger rests on a base which includes a outlet plenum and individual intake ports for each cylinder. The entire assembly of the cover with its intake plenum, the heat exchanger, the outlet plenum are preferably secured by through bolts.

Air flow through the heat exchanger is largely symmetrical, i.e., straight top to bottom. That air flow is uniform and straight from the intake plenum, enters uniformly into the heat exchanger, passes to the outlet plenum and then to the intake ports of each cylinder. The outlet plenum contains the openings for the tuned intake runners. This invention not only retains but also enhances the function of the tuned intake runners by reducing turbulence and improving distribution. Indeed, as will be described further below, the heat exchanging material in the heat exchange unit acts to even the air flow, but does not substantially reduce the boost pressure. The symmetry of the heat exchanger allows the connections to the cooling water to be made on either side of the engine. This provides a high degree of flexibility in connecting the source and returns for cooling water. Cooling water flows through plate and fin passages in a double or single pass path from the water intake ports to the water output ports via the U-shaped path on one side of the aftercooler, through the heat exchanger and after a sharp turn, returns to the inlet side. Double pass air to liquid heat exchangers are more effective than single pass. In addition, their use minimizes the side-to-side heat gradient associated with single pass heat exchangers. While use of double pass air to liquid heat exchangers optimizes the invention, their use is not essential.

The heat exchanger is reversible for either left or right side cooling water connections. The cover and its intake plenum are also reversible, left to right, to accept supercharged air ducting from either the left side or right side of the engine. The outlet plenum is interchangeable to match the porting of a particular engine type. Examples are shown in the drawings. It should be recognized that the porting of most engines could be matched by selection of a matching design of the lower manifold of this invention without change of the remainder of the aftercooler.

BRIEF DESCRIPTION OF THE DRAWINGS

This invention may be more clearly understood with the following detailed description and by reference to the drawings in which.

DETAILED DESCRIPTION OF THE INVENTION

Figure 1:
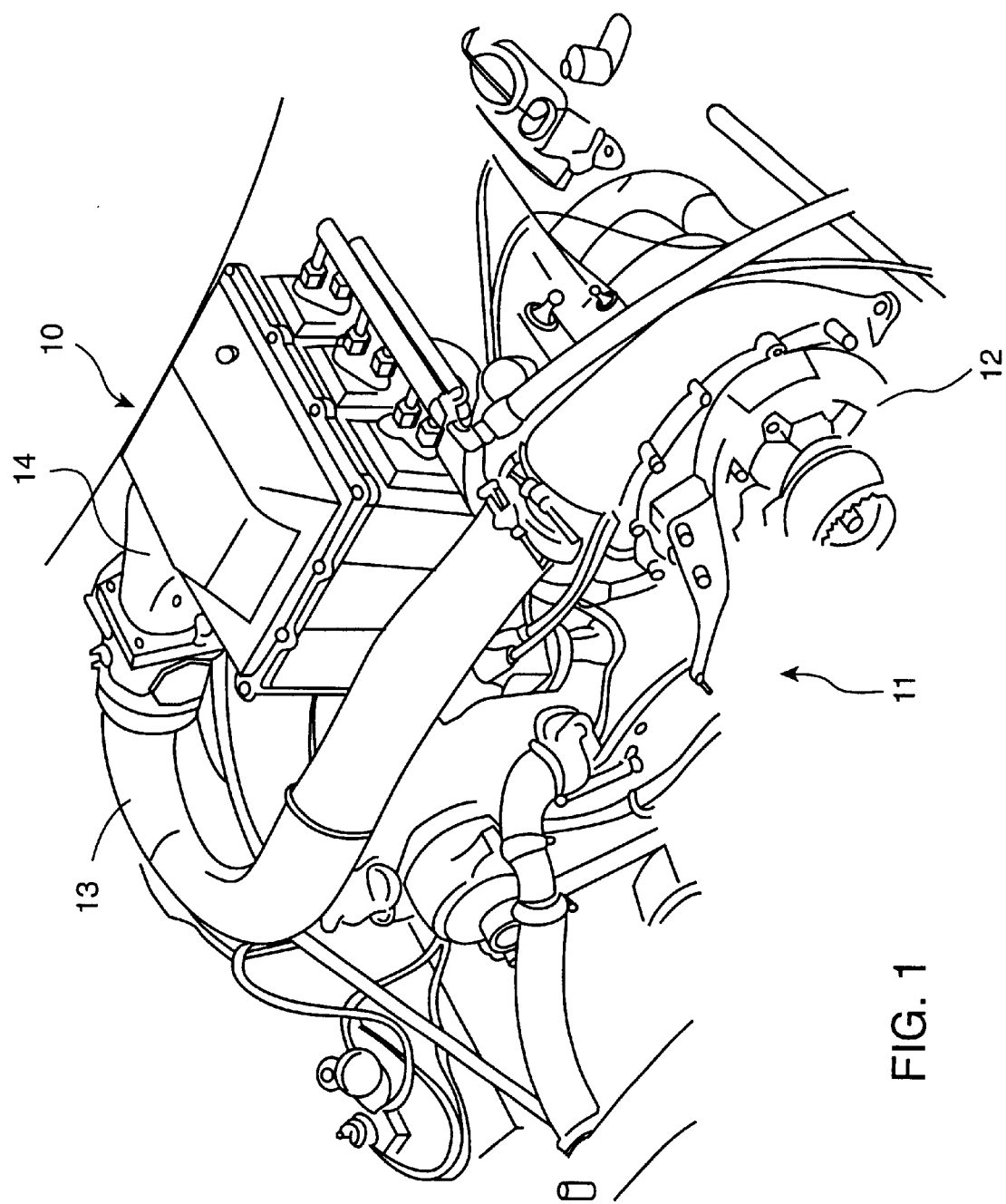
FIG. 1 is a perspective view of a V-block engine with the aftercooler of the invention installed along with a supercharger.
Figure 3:
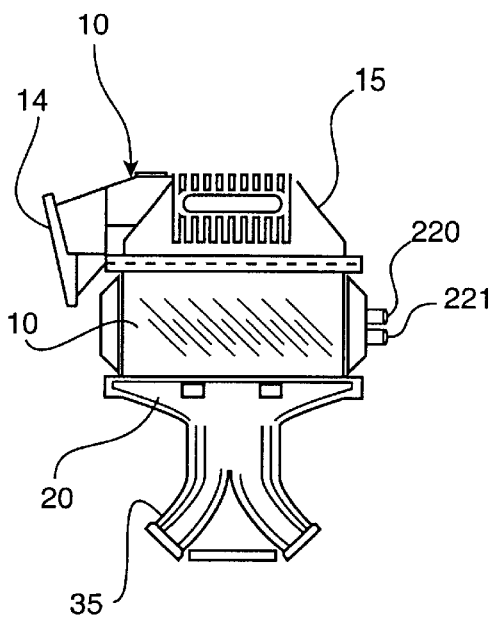
FIG. 3 is a front elevational view of the aftercooler of FIG. 2.
Figure 4:
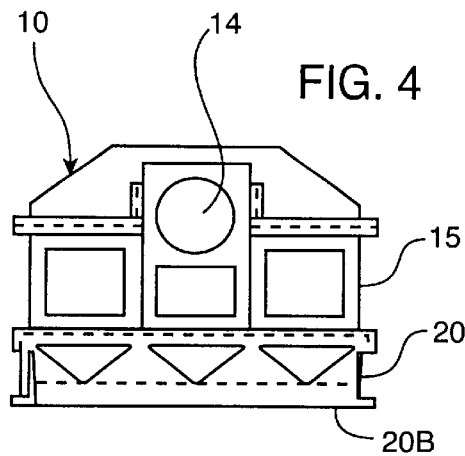
FIG. 4 is an air intake side elevational view of the aftercooler of FIG. 2.
Figure 2:
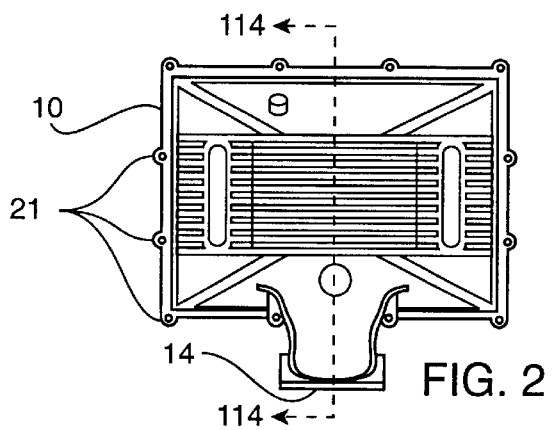
FIG. 2 a top plan view of a first preferred embodiment of the supercharger aftercooler.

Now referring to FIG. 1 in combination with FIGS. 2, 3 and 4, the aftercooler 10 of this invention may be seen in FIG. 1 as it appears connected to a V-8 5.0 liter automobile engine 11 which is equipped with a centrifugal supercharger 12 of the type disclosed in my above referenced patent. However, other superchargers can be used with the aftercooler of the invention. The supercharged intake air from the supercharger 12, which supplies pressurized charge air, is coupled via duct 13 to the inlet port 14 of the aftercooler 10. The aftercooler 10 is liquid-cooled (e.g. by water) and replaces the normal intake manifold of the engine by a direct connection to the existing bolt holes in the cylinder heads.

The aftercooler 10 of this invention is better seen in FIGS. 2, 3 and 4 when viewed with FIG. 1, which illustrate the basic shape and relative size of the aftercooler 10 as compared with other engine components. This aftercooler 10 comprises basically three parts or sections, (1) the cover and intake plenum section 15; (2) the cooling and air flow straightening heat exchanger 16; and (3) the base and outlet plenum 20 with an engine intake manifold coupling section 35.

The inlet port 14 is best shown in FIG. 4 and mates with the duct or throttle body 13 of FIG. 1, which supplies intake air from supercharger 12 to the engine 11. The cover 15, the heat exchanger 16 and the base 20 are secured together via bolts (not shown) passing through the bolt holes 21 best seen in FIG. 2. Each of the three sections of the aftercooler 10 may be disassembled and reversed, if necessary, to accommodate either left side or right side air intake duct 13 location or either left side or right side cooling water supply and return to the heat exchanger 16, without interfering with the function of the tuned intake runners.

Figure 9:
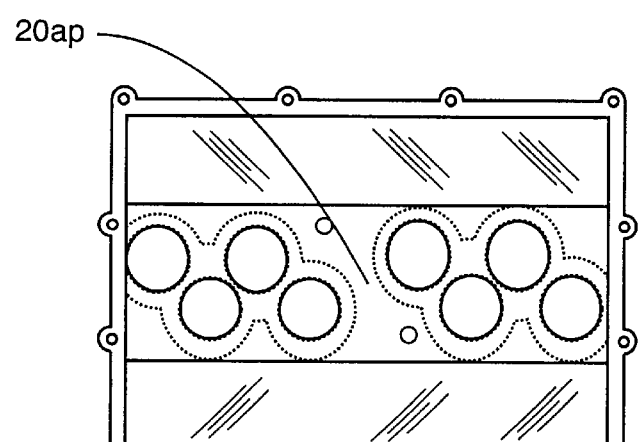
FIG. 9 is a top plan view of the base and outlet plenum of this invention designed to mate with tuned intake ports of the engine.
Figure 10:
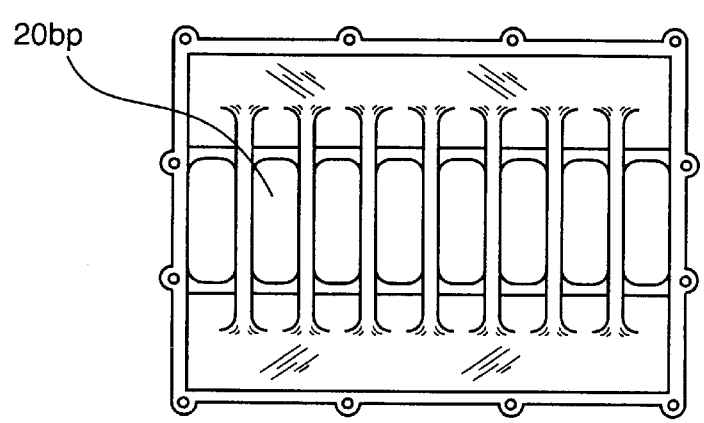
FIG. 10 is a top view of the base and outlet plenum section of the aftercooler of this invention designed with intake separating fins defining rectangular intake ports that match with a different type of porting.

The base and outlet plenum 20 may be made in various interchangeable configurations with the bottom surface 20B of FIG. 4 defining intake ports which match those of the engine manifold. Examples of two different types of bases 20 are shown in FIGS. 9 and 10. The basic requirements of the base are:

a) a match to heat exchanger 16;

b) a match to the attachment pattern of the former intake manifold of the engine; and c) provision or maintenance of tuning and distribution of intake air to the cylinders, to match the tuned runners in the porting of the engine.

Figure 5:
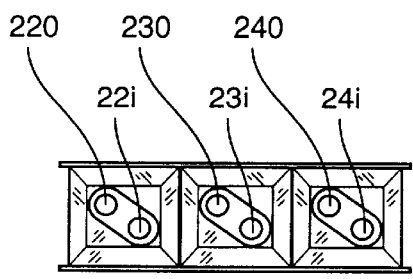
FIG. 5 is the water intake side elevation view of the heat exchanger with the inlet and outlet ports showing three cooling liquid pipes.
Figure 7:
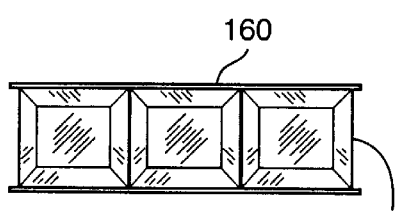
FIG. 7 is the opposite side elevation view to FIG. 5 of the heat exchanger.
Figure 6:
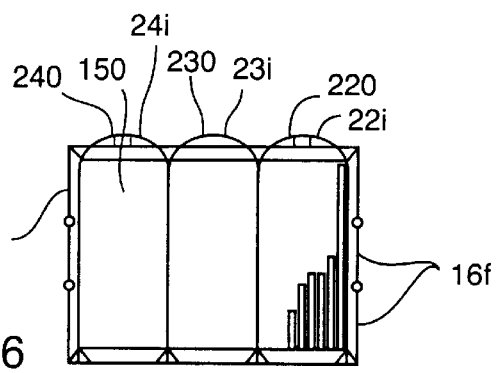
FIG. 6 is a partially exposed top plan view of the heat exchanger of the aftercooler.

In FIG. 5, the cooling water tubes (not shown) supply cooling water to the inlet couplings 22$i$–24$i$, and water flows out of heat exchanger 16 through outlet couplings 22$o$–24$o$ in front wall 22 of heat exchanger 16. The cooling water supply flows through a single or double pass route with the discharge outlets (22$o$–24$o$) on the same side as the inlets (22$i$–24$i$). There is one inlet port (22$i$, 23$i$, 24$i$) and one outlet port (22$o$, 23$o$, 24$o$) for heat exchanger sections as shown in FIGS. 4, 5 and 6. Although as shown in FIGS. 4–6, three heat exchangers are depicted, depending upon the application, one, two, three, four, six, or more heat exchangers can be used. The water passages are defined by plates between adjacent passages similar to conventional automobile radiators.

Figure 8:
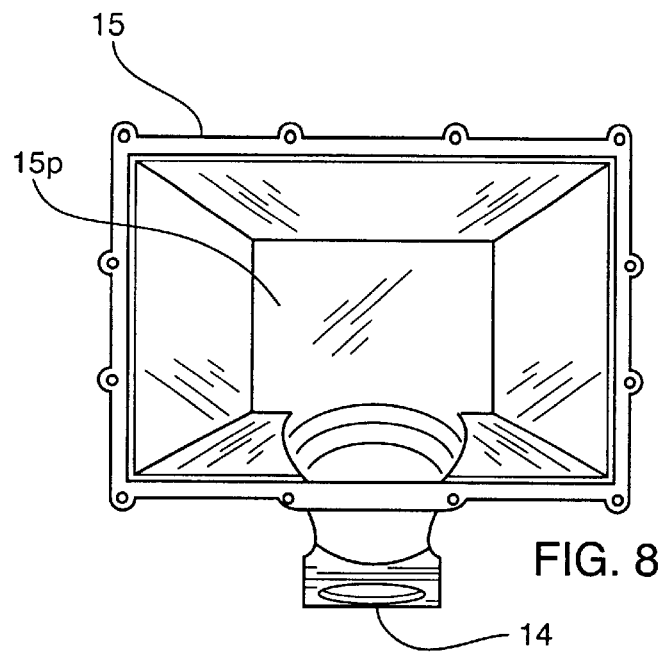
FIG. 8 is a bottom plan view of the cover showing the intake plenum.

In FIG. 6, the upper surface 16$u$ of the heat exchanger 16 includes straight-through air flow paths 16$f$ having an appearance somewhat similar to the air flow paths through the core of a conventional automotive radiator. These provide linear and possibly laminar flow into the air distribution chamber 20$a$ of any form of base 20, shown in FIG. 11. This straight-through flow and the even distribution of intake air is also aided by the upper plenum chamber 15p of the cover 15 appearing in FIG. 8. The intake plenum chamber 15p aids in even distribution of the incoming air arriving at port 14 to the heat exchanger 16.

The outlet plenum 20ap of FIGS. 9 and 20bp of FIG. 10 tapers toward the intake ports of the engine's lower intake manifold, aids in distributing the intake air to the intake ports for each of the cylinders and assists in the preservation of the tuned runners.

Figure 12:
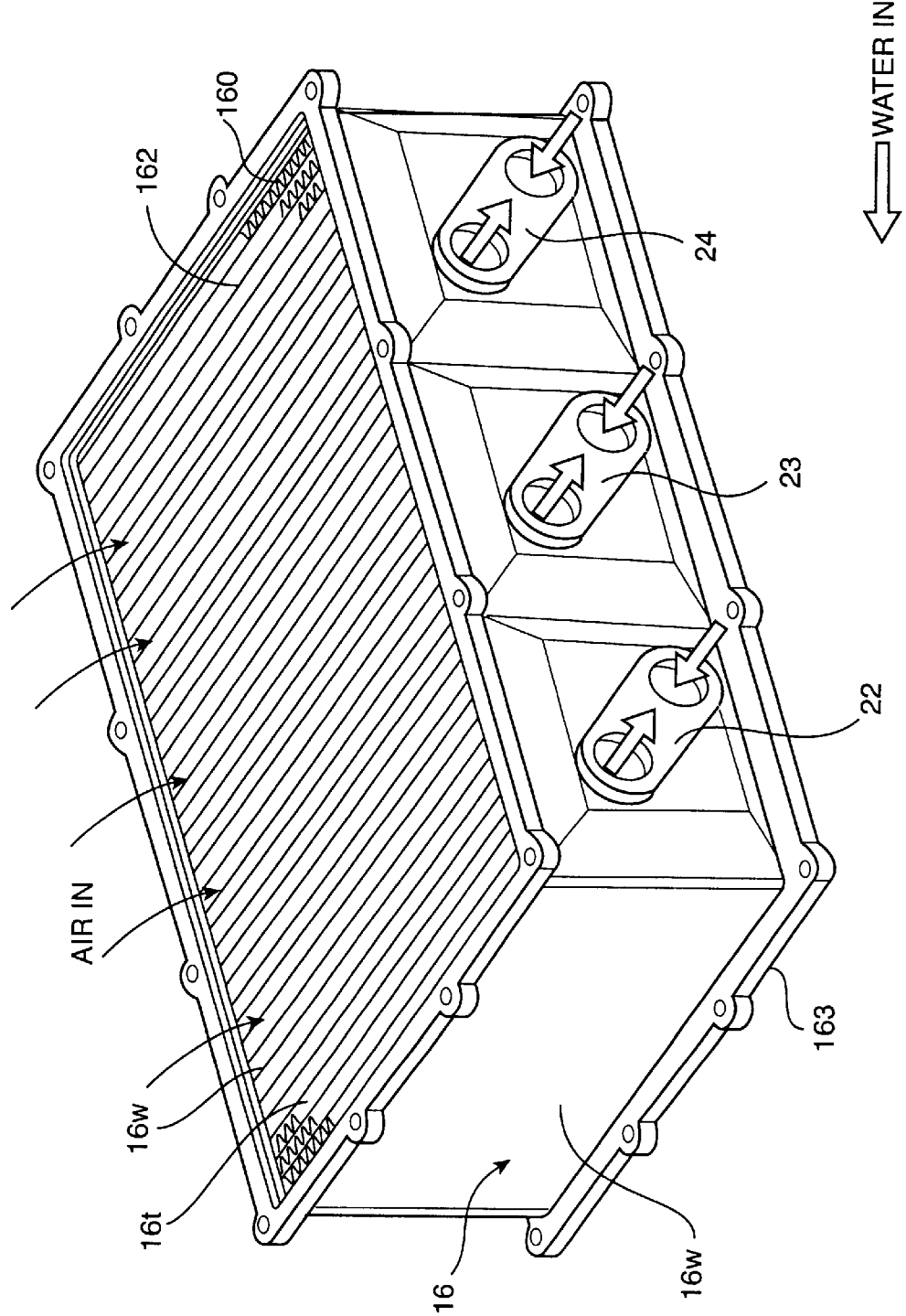
FIG. 12 is a perspective, partially exposed view of a flanged heat exchanger core assembly.

A flanged type heat exchanger 16 may also be seen in FIG. 12 with the top being broken away to show the core elements. The core 16C includes vertical sheets or plates 16P defining the straight air flow passages or flow path 16F extending top to bottom alternating with water flow passages 16W, best seen in the broken away portion of FIG. 12A. The core is preferably fabricated from efficient heat transfer material such as aluminum and enclosed in a box-like exterior for mounting. Welded top and bottom flanges 16T and 16B complete the core 16.

Figure 12A:
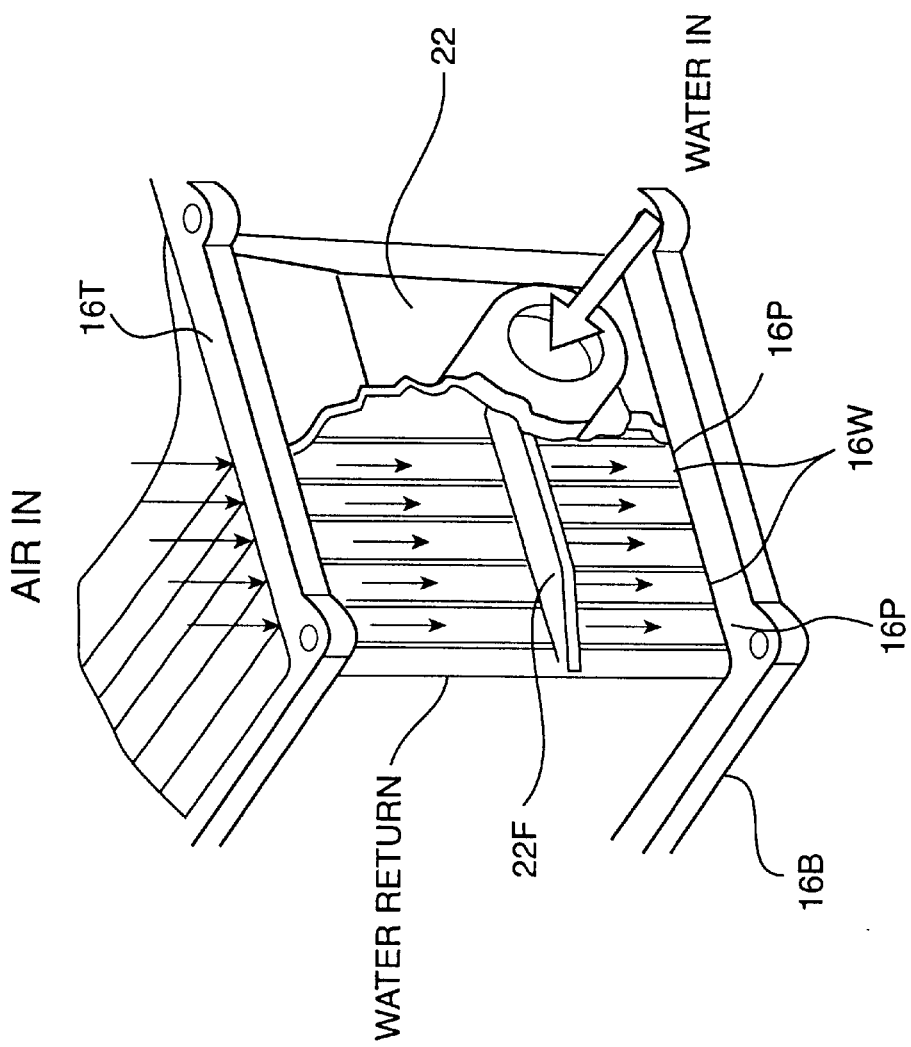
FIG. 12A is a fragmentary perspective view of a section of a portion of the heat exchanger of FIG. 12 with portions broken away to show the internal water flow into the heat exchanger and out through the water return.

Now referring to FIG. 12A where a portion of the water inlet cover 22 has been broken away, it is possible to see the central flange or horizontal wall portion 22F which segregates the inlet water tubes from the outlet or return water tubes.

Figure 11:
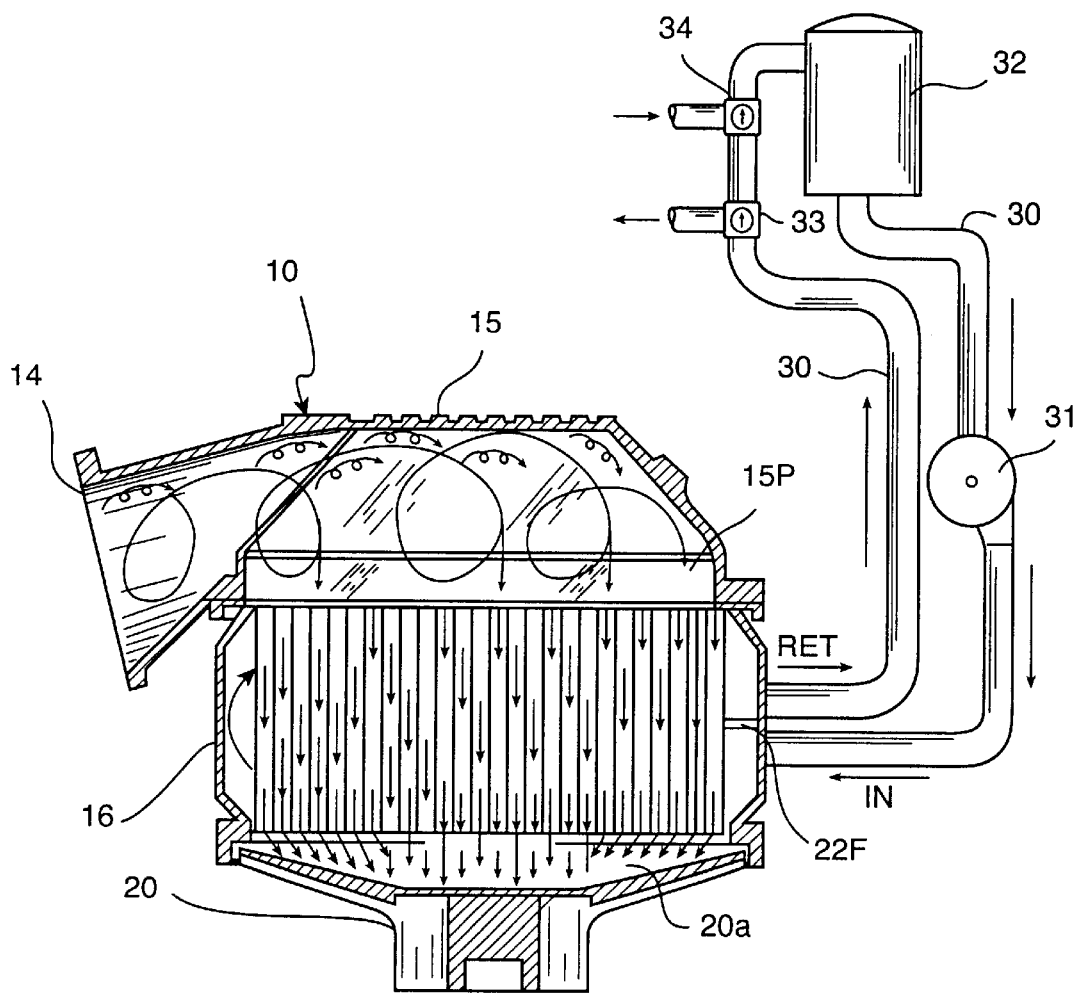
FIG. 11 is a vertical sectional view through the aftercooler of this invention with the water supply accessories shown schematically and the water and air flow paths illustrated by arrows.
Figure 12B:
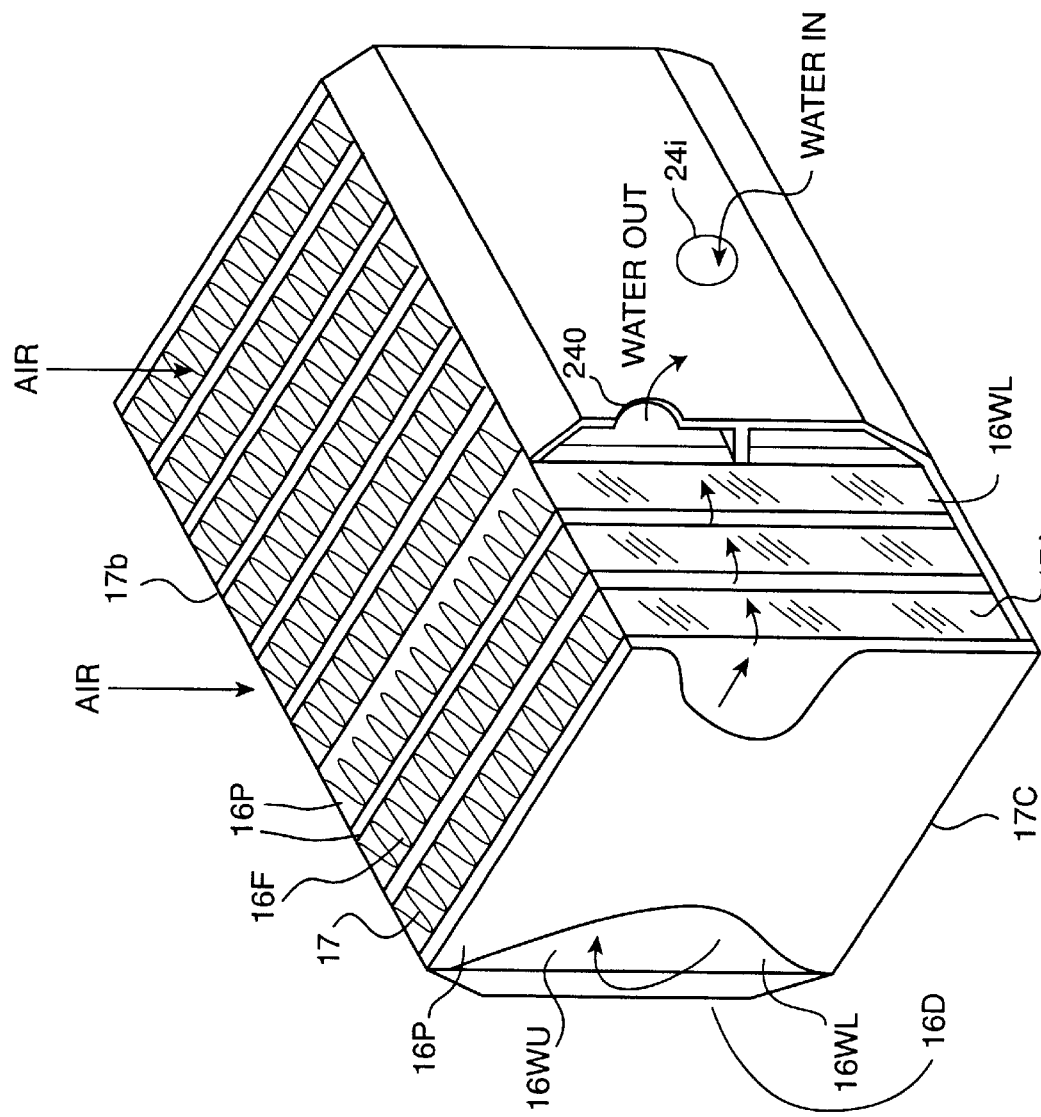
FIG. 12B is another partially exposed perspective view of a section of the heat exchanger of FIG. 12.

Referring to FIG. 12B another partially exposed view of the heat exchanger 16 is shown with a single core unit. Preferably, heat exchange material 17 is placed in the air passageways 16F to aid in efficient cooling of supercharged air. This material 17 is preferably accordion folded and can also aid in evening out excessive turbulence in the air. Vertical caps 17a seal off vertical ends of air passageways 16F. The top and bottom walls 17b and 17c of the heat exchanger allow air to flow into air passageways 16F but seal off water passageways 16w. The front wall 22 has a short divider 22F which helps separate the water passageway 16W into an upper portion 16WU closer to air inlet side and a lower portion 16WL closer to the air outlet side. Cool water enters the lower water passageway portion 16WL through inlet 24i, travels towards back wall 16d, turns up and around, and travels back through upper water passageway portion 16WU. This double pass water travel design with incoming cooler water entering downstream of the outgoing water more efficiently cools the supercharged air than does a single pass arrangement (not shown) or a single pass side-to-side double pass design (also not shown.) However, a single pass, or side-to-side double pass design will also function. Both the air and water paths through the aftercooler 10 are shown in FIG. 11 which is a transverse sectional view through the aftercooler 10, partly broken away to show the short divider 22F extending from front wall 22 which helps separate the incoming water flow path IN from the return flow path RET. FIG. 11 also shows a complete system including cooling water piping 30, a cooling water pump 31 and a reservoir 32. The pump 31 may be either belt-driven from the engine or preferably electrically driven by the electrical system of the vehicle.

The inventor has found that a flow rate of about 57 liters (15 gallons) per minute is appropriate with the reservoir 32 having a capacity of 26 to 38 liters (seven to ten gallons) of water or other coolant. For one-quarter mile drag or other similar races, the reservoir may include 19 liters (five gallons) of ice water in the reservoir for maximum rapid cooling.

Whether the vehicle is intended for street or racing operation, the aftercooler of this invention provides improved supercharged operation. For the continuous duty of street use, an option of an additional radiator may be added at the three-way valves 33 and 34.

Figure 13:
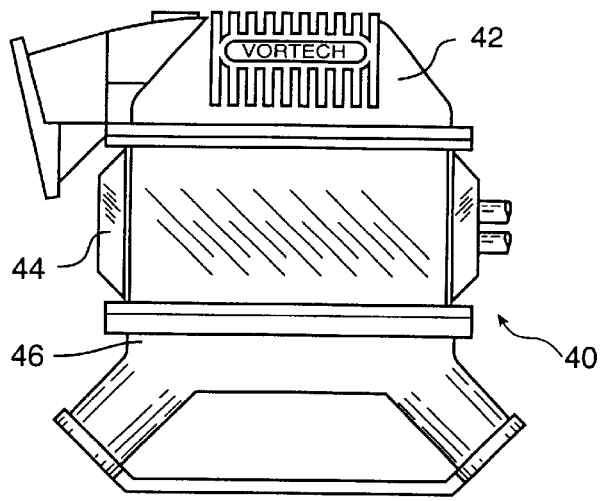
FIG. 13 is a front view of a second embodiment of the aftercooler of the invention having an integrated one-piece outlet plenum and manifold.

Turning to FIG. 13, a front view of a second embodiment of the invention, an aftercooler 40 having an intake plenum 42, heat exchanger 44, and an integrated one-piece outlet plenum and manifold 46, is shown. In other respects, aftercooler 40 is constructed and functions in the same manner as described with the aftercooler of FIGS. 1–12.

Figure 14:
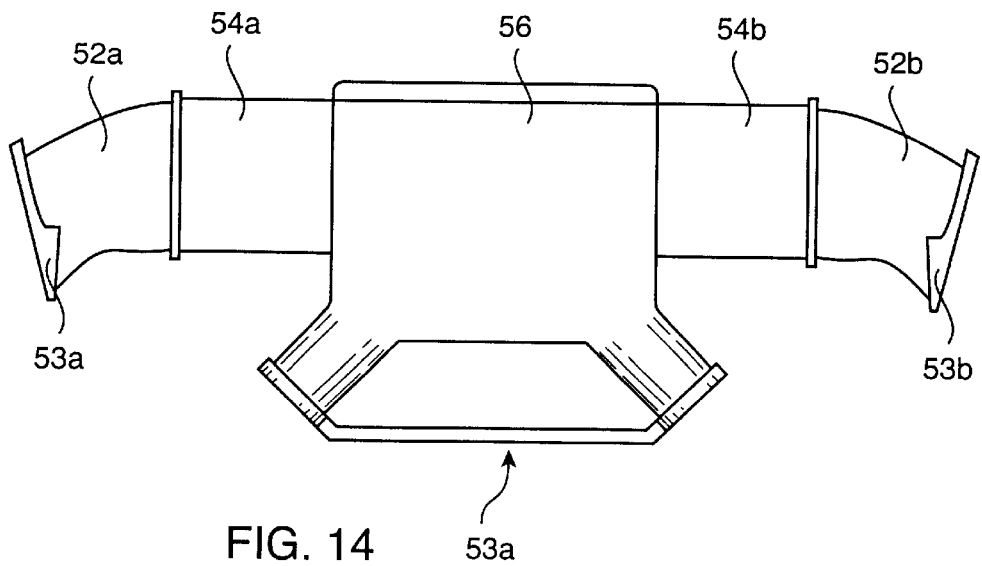
FIG. 14 is a front view of a third embodiment of the low profile aftercooler of the invention having two inlet plenums and two heat exchangers.

FIG. 14 is a front view of a third embodiment of the invention, a low profile aftercooler 50 of the invention having two intake plenums 52a and 52b with separate intake openings 53a and 53b, and two heat exchangers 54a and 54b. Intake plenums 52a and 52b and heat exchangers 54a and 54b are placed on opposite sides of a combination outlet plenum and manifold 56. Because intake plenums 52a and 52b and heat exchangers 54a and 54b connect to the sides 58a and 58b of combination outlet plenum and manifold 56, the overall height of aftercooler 50 can be made substantially lower than the other embodiments of aftercoolers. Because of this change, the cooled air passed through heat exchangers 54a and 54b will need to turn from a horizontal direction to a vertical direction in combination outlet plenum and manifold 56. Proper design of the combination outlet plenum and manifold 56 will direct the cooled air flow in the correction direction. In other respects, aftercooler 50 is constructed and functions in the same manner as described with the aftercooler of FIGS. 1–12.

Figure 15:
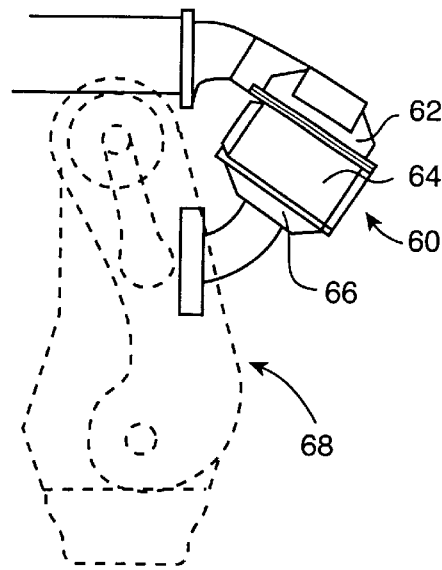
FIG. 15 is a front view of a fourth embodiment of the low profile aftercooler of the invention for use with four cylinder motors.

FIG. 15 is a front view of a fourth embodiment of the invention, an aftercooler 60 for use with four cylinder motors. In this embodiment of aftercooler 60, intake plenum 62 has inlet, a lower heat exchanger 64 and a combination outlet plenum and manifold 66 which can be bolted to the cylinder head (shown as 68 in phantom lines). In other respects, aftercooler 60 is constructed and functions in the same manner as described with the aftercooler of FIGS. 1–12.

With respect to each embodiment of the invention, by placing the aftercooler in close proximity to the cylinder head, achieves efficient cooling of the supercharged air without substantial loss of boost pressure.

The drawings and the foregoing description are not intended to represent the only form of the invention regarding the details of its construction and manner of operation. Indeed, it will be evident to one skilled in the art that modifications and variations may be made without departing from the spirit and scope of the invention. Although specific terms have been employed, they are intended in a generic and descriptive sense only and not for the purpose of limitation, the scope of the invention being delineated in the following claims.

I claim:

1. An aftercooler for a supercharged internal combustion engine for cooling supercharged air delivered to the internal combustion engine from the supercharger, comprising:

(a) at least one air intake plenum having an air inlet for receiving supercharged air from the supercharger and an air outlet, the air intake plenum having a domed top with downwardly slanted side walls adapted to evenly distribute the supercharged air at the air outlet;

(b) at least one liquid-to-air heat exchanger unit having, an air intake side and an air outlet side, front and back walls, side walls, and a plurality of air passageways passing from the air intake side to the air outlet side, the air outlet of the air intake plenum being attached to the air intake side of the liquid-to-air heat exchanger unit, the combination of the air intake plenum and the liquid-to-air heat exchange unit thereby symmetrically and uniformly directing the supercharged airflow through the liquid-to-air heat exchanger unit to reduce turbulence and improve air distribution and thereby provide improved cooling, a plurality of cooling liquid passageways having at least one cooling liquid inlet and at least one cooling liquid outlet, the plurality of air passageways passing adjacent to the cooling liquid passageways to cool the supercharged air passing through the liquid-to-air heat exchanger unit; and (c) at least one cooled air inlet plenum having at least one air inlet for receiving cooled supercharged air from the at least one liquid-to-air heat exchanger unit and having cooled air outlets adapted for evenly directing the supercharged cooled air to tuned inlet runners of a cylinder head of an internal combustion engine.

2. The aftercooler of claim 1, wherein the at least one liquid-to-air heat exchanger unit is directly connected to the cooled air plenum without any additional air ducting and the cooled air plenum and the tuned inlet runners are directly connected to the internal combustion engine without any additional air ducting so as to lessen decreases in supercharged air pressure.

3. The aftercooler of claim 1, wherein the tuned inlet runners are incorporated into the cooled air plenum.

4. An aftercooler for a supercharged internal combustion race cars engine having a primary cooling system, the aftercooler being for cooling supercharged air delivered to the internal combustion engine from the supercharger, the aftercooler comprising:

(a) at least one air intake plenum having an air inlet for receiving supercharged air from the supercharger and an air outlet, the air intake plenum having a domed top with downwardly slanted side walls adapted to evenly distribute the supercharged air at the air outlet;

(b) at least one liquid-to-air heat exchanger unit having, an air intake side and an air outlet side, front and back walls, side walls, a plurality of air passageways passing from the air intake side to the air outlet side, a plurality of cooling liquid passageways having at least one cooling liquid inlet and at least one cooling liquid outlet, the plurality of air passageways passing adjacent to the cooling liquid passageways to cool the supercharged air passing through the liquid-to-air heat exchanger unit, the air outlet of the air intake plenum being attached to the air intake side of the liquid-to-air heat exchanger unit, wherein the combination of the air intake plenum and the liquid-to-air heat exchange unit thereby symmetrically and uniformly directing the supercharged airflow through the liquid-to-air heat exchanger unit to reduce turbulence and improve air distribution and thereby provide improved cooling;

(c) a secondary cooling liquid system that is separate from the primary cooling system of the internal combustion engine, the secondary cooling liquid system having a separate cooling liquid reservoir for holding cooling liquid and being connected to the at least one cooling liquid inlet and the at least one cooling liquid outlet of the at least one liquid-to-air heat exchanger unit; and (d) at least one cooled air outlet plenum having at least one air inlet for receiving cooled air from the at least one liquid-to-air heat exchanger unit and having cooled air outlets adapted for evenly directing the supercharged cooled air to a cylinder head of an internal combustion engine.

5. The aftercooler of claim 4, wherein the secondary cooling liquid system further comprises a separate pump and piping, the separate pump being adapted to pump cooling liquid from the separate cooling liquid reservoir through the piping and through the at least one liquid-to-air heat exchanger unit.

6. The aftercooler of claim 5, further comprising tuned inlet runners connected to the cylinder head of the internal combustion engine.

7. The aftercooler of claim 5, wherein the cooled air outlet plenum is adapted to directly connect to a manifold which is adapted to directly connect to the internal combustion engine, the manifold comprising the tuned inlet runners.

8. The aftercooler of claim 5, wherein the separate cooling liquid reservoir has a capacity of between 18 to 38 liters.

9. The aftercooler of claim 5, wherein the at least one liquid-to-air heat exchanger unit is directly connected to the cooled air outlet plenum without any additional air ducting and the cooled air outlet plenum and tuned inlet runners are directly connected to the internal combustion engine without any additional air ducting so as to lessen decreases in supercharged air pressure.

10. An aftercooler for a supercharged internal combustion engine for cooling supercharged air delivered to the internal combustion engine from the supercharger, comprising:

(a) at least one air intake plenum having an air inlet for receiving supercharged air from the supercharger and an air outlet;

(b) at least one liquid-to-air heat exchanger unit having, an air intake side and an air outlet side, front and back walls, side walls, a plurality of air passageways passing from the air intake side to the air outlet side, wherein the plurality of air passageways comprise a plurality of spaced apart pairs of spaced apart vertical walls having upper and lower ends and opposing front and rear sides, side cap portions to seal off each of the pairs of spaced apart vertical walls at their front and rear sides, the upper and lower ends of the spaced apart walls being open for air passage, a plurality of cooling liquid passageways having at least one cooling liquid inlet and at least one cooling liquid outlet, wherein the plurality of liquid passageways are formed by upper horizontal walls and lower horizontal walls, the upper horizontal walls being positioned at upper ends of the spaced apart pairs of spaced part vertical walls and extending between the plurality of the air passageways from the front and the rear sides, the lower horizontal walls being positioned at the lower ends of the spaced apart pairs of spaced part vertical walls and extending between the plurality of the air passageways from the front and the rear sides, the plurality of air passageways passing adjacent to the cooling liquid passageways to cool the supercharged air passing through the liquid-to-air heat exchanger unit, the air outlet of the air intake plenum being attached to the air intake side of the liquid-to-air heat exchanger unit; and (c) at least one cooled air outlet plenum having at least one air inlet for receiving cooled air from the at least one liquid-to-air heat exchanger unit and having cooled air outlets adapted for evenly directing the supercharged cooled air to tuned inlet runners connected to a cylinder head of an internal combustion engine.

11. The aftercooler of claim 10, further comprising a secondary cooling liquid system that is separate from a primary cooling system used for cooling of the internal combustion engine, the secondary cooling liquid system having a separate cooling liquid reservoir for holding cooling liquid and being connected to the at least one cooling liquid inlet and the at least one cooling liquid outlet of the at least one liquid-to-air heat exchanger unit.

12. The aftercooler of claim 11, wherein the secondary cooling liquid system further comprises a separate pump and piping, the separate pump being adapted to pump cooling liquid from the separate cooling liquid reservoir through the piping and through the at least one liquid-to-air heat exchanger unit.

13. The aftercooler of claim 10, wherein the cooled air outlet plenum is adapted to directly connect to a manifold which is adapted to directly connect to the internal combustion engine, the manifold comprising the tuned inlet runners.

14. The aftercooler of claim 10, wherein the separate cooling liquid reservoir has a capacity of between 18 to 38 liters.

15. The aftercooler of claim 10, wherein the at least one liquid-to-air heat exchanger unit is directly connected to the cooled air outlet plenum without any additional air ducting and the cooled air outlet plenum and tuned inlet runners are directly connected to the internal combustion engine without any additional air ducting so as to lessen decreases in supercharged air pressure.

* * * * *